US012633109B2

(12) United States Patent
Lv et al.

(10) Patent No.: US 12,633,109 B2
(45) Date of Patent: May 19, 2026

(54) METHOD FOR DETECTING CIGARETTE APPEARANCE DEFECT BASED ON VARIATIONAL BAYESIAN INFERENCE

(71) Applicant: HONGYUNHONGHE TOBACCO (GROUP) CO., LTD, Yunan (CN)

(72) Inventors: Xianzhou Lv, Yunan (CN); Lin Qi, Yunan (CN); Yuxiang Cui, Yunan (CN); Dan Lin, Yunan (CN); Faqing Lv, Yunan (CN); Liang Cheng, Yunan (CN); Lu Yang, Yunan (CN); Bing Liu, Yunan (CN); Meilin Yi, Yunan (CN); Yunmei Wang, Yunan (CN); Yuedong Qian, Yunan (CN); Shichao Wu, Yunan (CN); Yunyu Gong, Yunan (CN)

(73) Assignee: HONGYUNHONGHE TOBACCO (GROUP) CO., LTD, Yunan (CN)

( * ) Notice: Subject to any disclaimer, the term of this patent is extended or adjusted under 35 U.S.C. 154(b) by 279 days.

(21) Appl. No.: 18/570,078

(22) PCT Filed: Feb. 24, 2023

(86) PCT No.: PCT/CN2023/078093
§ 371 (c)(1),
(2) Date: Dec. 14, 2023

(87) PCT Pub. No.: WO2024/159563
PCT Pub. Date: Aug. 8, 2024

(65) Prior Publication Data
US 2025/0095353 A1    Mar. 20, 2025

(30) Foreign Application Priority Data
Feb. 3, 2023   (CN) .......................... 202310092925.2

(51) Int. Cl.
*G06V 10/00*    (2022.01)
*G06T 7/00*    (2017.01)
(Continued)

(52) U.S. Cl.
CPC ............ *G06V 10/84* (2022.01); *G06T 7/0004* (2013.01); *G06V 10/764* (2022.01);
(Continued)

(58) Field of Classification Search
CPC .......... G06N 3/08; G06N 3/042; G06N 3/047; G06N 3/0454; G06N 3/0475;
(Continued)

(56) References Cited

U.S. PATENT DOCUMENTS

| | | | |
|---|---|---|---|
| 10,311,334 B1 * | 6/2019 | Florez Choque | .... G06N 3/0464 |
| 11,049,243 B2 * | 6/2021 | Odry | ...................... G06F 18/29 |

(Continued)

FOREIGN PATENT DOCUMENTS

| | | |
|---|---|---|
| CN | 113506247 | 10/1921 |
| CN | 111968084 | 11/2020 |

(Continued)

OTHER PUBLICATIONS

Guowu et al., "CN114170161A Cigarette appearance defect detection method and system"; Global Dossier; Publication Mar. 11, 2022.*

*Primary Examiner* — Amir Alavi
(74) *Attorney, Agent, or Firm* — SOROKER AGMON NORDMAN RIBA

(57) ABSTRACT

The present application discloses a method for detecting cigarette appearance defects based on variational Bayesian inference. In a cigarette appearance defect detection scenario, in order to solve the problem that a current point estimation-based machine learning algorithm leads to an overconfidence decision in a data scarcity area, the present (Continued)

application proposes a variational inference-based Bayesian method to improve a SSD backbone network. The present application can improve the accuracy of defect detection without losing the processing speed, not only saving a large amount of manpower and material resources, but also effectively providing reliable technical support for finding the root causes of defect types. Thus, it achieves intelligent quality risk management and control in a cigarette production workshop.

7 Claims, 2 Drawing Sheets

(51) Int. Cl.

| | |
|---|---|
| *G06V 10/764* | (2022.01) |
| *G06V 10/77* | (2022.01) |
| *G06V 10/84* | (2022.01) |

(52) U.S. Cl.
CPC ................... *G06V 10/7715* (2022.01); *G06T 2207/20076* (2013.01); *G06T 2207/20081* (2013.01); *G06T 2207/30108* (2013.01)

(58) Field of Classification Search
CPC ........ G06N 3/0464; G06N 5/04; G06V 10/82; G06V 10/84; G06V 10/761; G06V 10/762; G06V 10/764; G06V 10/765; G06V 10/7715; G06V 10/766; G06F 18/00; G06T 7/0004; G06T 2207/20081; G06T 2207/20084; G06T 2207/20076; G06T 2207/30108; Y02P 90/30
See application file for complete search history.

(56) References Cited

U.S. PATENT DOCUMENTS

| | | | | |
|---|---|---|---|---|
| 11,275,381 | B2 * | 3/2022 | Kandemir | G06F 18/29 |
| 11,373,305 | B2 * | 6/2022 | Zhang | G06T 1/20 |
| 11,545,255 | B2 * | 1/2023 | Sun | G06N 3/09 |
| 11,663,489 | B2 * | 5/2023 | Ghosh | G06N 20/00 |
| | | | | 382/100 |
| 11,669,998 | B2 * | 6/2023 | Lee | G06N 3/0455 |
| | | | | 382/103 |
| 12,269,177 | B2 * | 4/2025 | Jaini | G06N 3/09 |
| 2021/0049460 | A1 * | 2/2021 | Ahn | G06N 3/088 |
| 2021/0264294 | A1 | 8/2021 | Zheng et al. | |
| 2021/0295191 | A1 | 9/2021 | Bui et al. | |
| 2021/0406644 | A1 * | 12/2021 | Salman | G06N 3/08 |
| 2025/0095353 | A1 * | 3/2025 | Lv | G06F 18/00 |

FOREIGN PATENT DOCUMENTS

| | | |
|---|---|---|
| CN | 114170161 | 3/2022 |
| CN | 114463268 | 5/2022 |
| KR | 102119138 | 6/2020 |

* cited by examiner

METHOD FOR DETECTING CIGARETTE APPEARANCE DEFECT BASED ON VARIATIONAL BAYESIAN INFERENCE

CROSS-REFERENCE TO RELATED APPLICATION

This application claims priority to Chinese Patent Application No. 202310092925.2, filed on Feb. 3, 2023, and International Patent Application No. PCT/CN2023/078093, filed on Feb. 24, 2023, both of which are hereby incorporated by reference in their entireties.

TECHNICAL FIELD

The present application relates to the field of cigarette manufacturing, and m particular to a method for detecting cigarette appearance defects based on variational Bayesian inference.

BACKGROUND ART

The process-oriented production mode of cigarette factory can meet the requirements of mass production of cigarettes, but this rapid production mode means that the quality of products is difficult to be strictly controlled, which results in some defective cigarettes. It is of great significance for the development of production to find defective products m time during the production process and carry out trimming. If the unqualified cigarettes are not picked, they will enter the next packaging process. Defects in the production process will lead to differences in the appearance of cigarettes after packaging. If the customers purchase cigarette products containing defective products, the quality of the products will be questioned, resulting m the loss of customers. At the present stage, most cigarette and tobacco manufacturers in China use manual sampling for the detection of cigarette and tobacco, which means that cigarette and tobacco manufacturers cannot get comprehensive monitoring of product quality. Manual sampling inspection will not only cost human resources but also have missing problems, and lead to a large number of unqualified products into the market.

Because of the huge number of cigarette production, it is necessary to apply the algorithm based on in-depth learning to quickly classify the appearance quality defects of cigarette in real time, which can timely detect the products with appearance quality defects in the production process, so as to process and eliminate the defects. It can not only ensure the quality of cigarettes, but also help cigarette manufacturers to improve the efficiency of detecting defective products and achieve intelligent detection.

Based on the above, a method for detecting foreign matter in cut sections of cigarette packets combined with the Transformer architecture is proposed. The network includes modules of local information enhancement, feature extraction, candidate region generation and target detection. In the first step, the foreign matter detection data set of cut sections of cigarette packets is used as the input. In the second step, the information enhancement is performed on the image. In the third step, the feature extraction is performed. In the fourth step, a feature map with a set size is generated by fusing feature maps in the candidate region generation module. Finally, the defect detection of cigarette packets is performed.

After analyzing the prior art, it is considered in the present application that in the solution thereof, a convolution operation is used in the local information enhancement module, and the weight of a convolution layer in the calculation is completed by a point estimation. However, it is difficult to express uncertainty in an area with little or no data, which may cause an overconfidence decision. In addition, the two-stage target detection algorithm is combined in the existing method for target detection. Compared with the one-stage target detection algorithm, the computational complexity and the number of parameters of the two-stage target detection algorithm are relatively large, which results in the obvious limitation of inference efficiency.

SUMMARY OF THE INVENTION

In view of the above, the present application is directed to provide a method for detecting cigarette appearance defects based on variational Bayesian inference, so as to solve the problem that it is difficult to accurately identify product defects generated in a cigarette production process, especially an overconfidence decision problem caused by using point estimation in a convolution layer when an existing in-depth learning method performs target detection.

The technical solution adopted in the present application is as follows.

The present application provides a method for detecting cigarette appearance defects based on variational Bayesian inference, comprising:

pre-constructing a cigarette appearance defect detection model based on the variational Bayesian inference, wherein the cigarette appearance defect detection model is an SSD target detection model, and the cigarette appearance defect detection model comprises an improved backbone network based on the variational Bayesian inference method;

collecting appearance images of cigarettes assembled and cut in a cigarette production line as data to be detected; and performing real-time inference on the input cigarette appearance images by the cigarette appearance defect detection model to obtain a cigarette appearance defect detection result.

In at least one possible implementation, the improved backbone network based on the variational Bayesian inference method comprises calculating a posterior probability by variational inference, and replacing a point estimation mechanism of a convolution layer weight in a backbone network of an original SSD target detection model by probability distribution.

In at least one possible implementation, the training process of the cigarette appearance defect detection model comprises:

establishing a cigarette appearance defect detection data set as an input image data set.

extracting features by the improved backbone network by the variational Bayesian inference method to obtain a plurality of feature maps;

extracting information about the feature maps by a default box of each layer;

generating an offset of a detection box by a locator according to each piece of default box information, and comparing the offset with a ground truth to generate a locating loss;

generating a category label by a classifier according to each piece of default box information, and comparing the classified category with the ground truth to generate a classification loss;

integrating the classification loss and the locating loss to generate a total loss of the model and perform back propagation; and performing repeated iteration by the image data set until the set number of training is reached and an optimal model parameter is saved.

In at least one possible implementation, prior to the feature extraction, it further comprises:

inputting the cigarette appearance defect images and the ground truth, including a preset label and a bounding box; and calculating an IOU related to the default box, and converting the ground truth into the form of default box.

In at least one possible implementation, the performing real-time inference on the input cigarette appearance images by the cigarette appearance defect detection model comprises:

extracting feature maps based on the improved backbone network;

extracting information about the feature maps by a default box of each layer;

generating an offset of a detection box by a locator according to each piece of default box information; generating a category label by a classifier according to each piece of default box information;

eliminating invalid detection boxes and removing redundant detection boxes based on the detection box offset and the category label; and outputting a final prediction box and a corresponding category label.

In at least one possible implementation, the eliminating invalid detection boxes comprises eliminating detection boxes with labels as background.

In at least one possible implementation, the removing redundant detection boxes comprises removing redundant detection boxes by non-maximum suppression.

In at least one possible implementation, the backbone network is a pre-feature extraction network VGG16.

Compared with the prior art, the main design concept of the present application is that, in a cigarette appearance defect detection scenario, in order to solve the problem that a current point estimation-based machine learning algorithm leads to an overconfidence decision in a data scarcity area, a Bayesian method based on variational inference is proposed to improve the backbone network VGG16 of SSD, in particular, including calculating a real posterior probability by the variational inference method, replacing a point estimation mechanism of a convolution layer weight in the original backbone network VGG16 by using a form of probability distribution, then detecting the extracted features from the improved VGG16 by an SSD target detection algorithm, and furthermore, accurately determining whether the appearance of the cigarette is defective and the type and location of the defect. The present application can improve the accuracy of defect detection without losing the processing speed, not only saving a large amount of manpower and material resources, but also effectively providing reliable technical support for finding the root causes of defect types. Thus, it achieves intelligent quality risk management and control in a cigarette production workshop.

BRIEF DESCRIPTION OF THE DRAWINGS

The objects, technical solutions and advantages of the present application will become more apparent from the following detailed description when taken in conjunction with the accompanying drawings, in which.

DETAILED DESCRIPTION OF THE INVENTION

Figure 1:
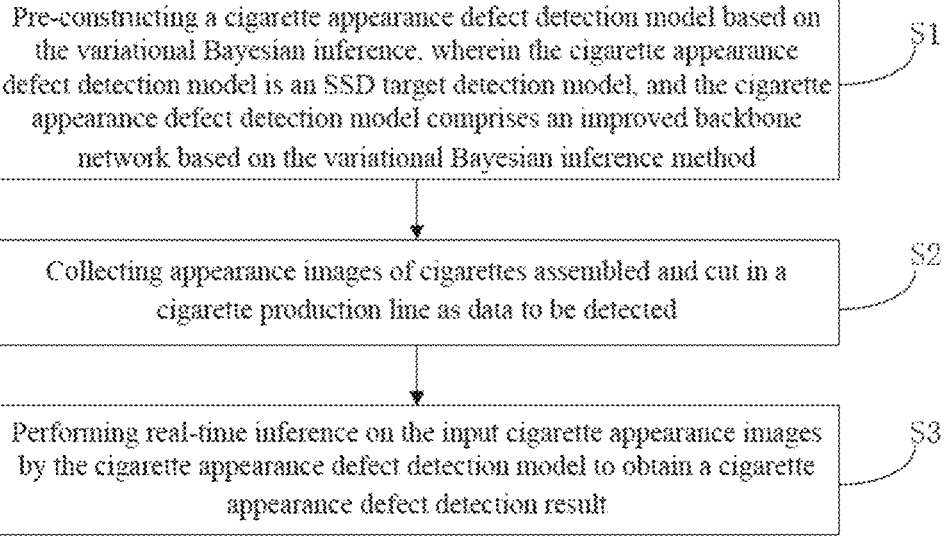
FIG. 1 is a flow diagram of a method for detecting cigarette appearance defects based on variational Bayesian inference provided in an embodiment of the present application.

Reference will now be made in detail to the embodiments of the present application, examples of which are illustrated in the accompanying drawings, wherein like reference numerals refer to the same or similar elements throughout the several views, and or refer to having the same or similar elements throughout the several views. The embodiments described below by reference to the drawings are exemplary, and they are only intended to be illustrative of the present application and are not to be construed as limiting the present application.

The present application proposes an embodiment of a method for detecting cigarette appearance defects based on variational Bayesian inference, specifically, as shown in FIG. 1, including:

step S1, pre-constructing a cigarette appearance defect detection model based on the variational Bayesian inference, wherein the cigarette appearance defect detection model is an SSD target detection model, and the cigarette appearance defect detection model comprises an improved backbone network (such as a pre-feature extraction network VGG16) based on the variational Bayesian inference method;

step S2, collecting appearance images of cigarettes assembled and cut in a cigarette production line as data to be detected; and step S3, performing real-time inference on the input cigarette appearance images by the cigarette appearance defect detection model to obtain a cigarette appearance defect detection result.

Herein, the improved backbone network based on the variational Bayesian inference method includes calculating a posterior probability by variational inference, and replacing a point estimation mechanism of a convolution layer weight in an original backbone network by probability distribution.

Further, the training process of the cigarette appearance defect detection model can be referred to as follows:

step S1-1, establishing a cigarette appearance defect detection data set as an input image data set;

step S1-2, extracting features by the improved backbone network by the variational Bayesian inference method to obtain a plurality of feature maps;

step S1-3, extracting information about the feature maps by a default box of each layer;

step S1-4, generating an offset of a detection box by a locator according to each piece of default box information, and comparing the offset with a ground truth to generate a locating loss;

step S1-5, generating a category label (content attributes in a characterization box, such as background, appearance with a certain defect, etc.) by a classifier according to each piece of default box information, and comparing the classified category with the ground truth to generate a classification loss;

step S1-6, integrating the classification loss and the locating loss to generate a total loss of the model and perform back propagation; and step S1-7, performing repeated iteration for steps S1-2 to S1-6 by the image data set, and saving an optimal model parameter after reaching the set number of training times;

Based on this concept, prior to performing the feature extraction, it further includes inputting the cigarette appearance defect images and the ground truth, including a preset label and a bounding box; and calculating an IOU related to the default box, and converting the ground truth into the form of default box. In practical operation, reference can be made to the existing SSD algorithm, and this will not be described in detail in the present application.

From the above training process, it will be appreciated that the performing real-time inference on the input cigarette appearance images by the cigarette appearance defect detection model includes:

step S31, extracting feature maps based on the improved backbone network;

step S32, extracting information about the feature maps by a default box of each layer;

step S33, generating an offset of a detection box by a locator according to each piece of default box information; generating a category label by a classifier according to each piece of default box information;

step S34, eliminating invalid detection boxes and removing redundant detection boxes based on the detection box offset and the category label; and step S35, outputting a final prediction box and a corresponding category label.

Herein, the eliminating invalid detection boxes includes eliminating detection boxes with labels as background. The way for removing redundant detection boxes includes removing redundant detection boxes by non-maximum suppression.

Figure 2:
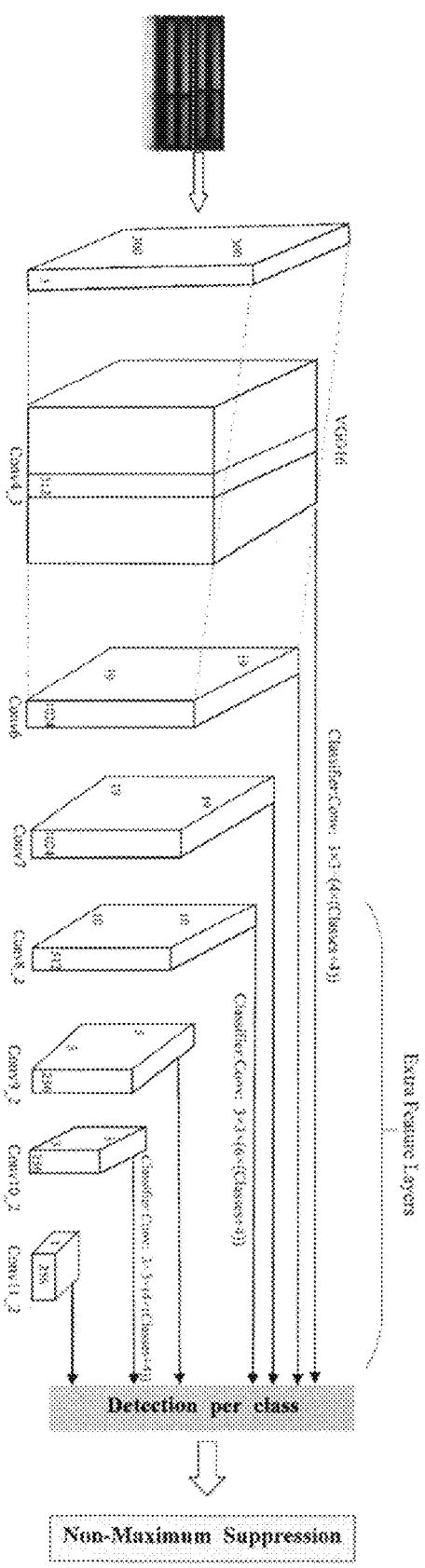
FIG. 2 is a schematic diagram of an SSD cigarette appearance defect detection model provided in an embodiment of the present application.

Here, the entire detection process of the model is schematically illustrated with reference to the following example. First, an SSD cigarette appearance defect detection model based on variational Bayesian inference is constructed, as shown in FIG. 2. The model includes the improved VGG16 and SSD target detection architecture based on the variational Bayesian inference, in which the pre-feature extraction task is implemented by using the improved VGG16. For example, in some embodiments, six feature maps may be extracted. A cigarette appearance image of 300×300×3 is input into a VGG16, and passes through two convolution layers (Conv1) in the VGG16 to obtain a feature map 1 with a size of 304×304×64; it passes through a pooling layer and two convolution layers (Conv2) to obtain a feature map 2 with a size of 152×152×128; it passes through a pooling layer and three convolution layers (Conv3) to obtain a feature map 3 with a size of 76×76×256; it passes through a pooling layer and three convolution layers (Conv4) to obtain a feature map 4 with a size of 38×38×512; it passes through a pooling layer and three convolution layers (Conv5) to obtain a feature map 5 with a size of 38×38×512; and it passes through a pooling layer and a 3×3×1024 convolution layer (Conv6) to obtain a feature map 6 with a size of 19×19×1024.

The SSD detection process can be obtained through subsequent processing of four convolution layers. The feature map output by the above-mentioned convolution layer Conv6 is subjected to a convolution operation (Conv7) of 1×1×1024 to obtain a feature map of 19×19×1024, and the generated 19×19×6=2166 candidate boxes are classified and regressed. No object is detected on the feature map. Then a convolution operation Conv8 of 1×1×256 and 3×3×512–s2 (s2 is stride=2) is performed to obtain a 10×10×512 feature map, and the generated 10×10×6=600 candidate boxes are classified and regressed. The target object still cannot be detected. Then, performing a convolution operation Conv9 includes, specifically, obtaining a feature map of 5×5×256 after 1×1×128 and 3×3×256–s2 convolutions, and the generated 5×5×6=150 candidate boxes are classified and regressed. Two targets can be detected. It continues to perform a convolution operation Conv10, specifically including obtaining a feature map of 3×3×256 after 1×1×128 and 3×3×256–s1 convolutions, classifying and regressing the generated 3×3×4=36 candidate boxes, and detecting one object. It continues to perform the last convolution operation Conv11, specifically, including obtaining a feature map of 1×1×256 after 1×1×128 and 3×3×256–s1 convolutions, classifying and regressing the generated 1×1×4=4 candidate boxes, and detecting one object.

Finally, after the classification and regression of the 5776+2166+600+150+36+4=8732 candidate boxes, the final detection result is obtained after non-maximum suppression of the detection result.

In order to verify the effectiveness of the above-mentioned SSD cigarette appearance defect detection method based on variational Bayesian inference, the present application uses an SSD original network to make a comparison with the method of the present application. Herein, the data set is the cigarette appearance defect data set mentioned in step S1-1 above. The evaluation indexes are AP50 when an IOU is 0.5, and AP75 and FPS when an IOU is 0.75. The obtained comparison results are shown in the following table.

| Model | AP50/% | AP75/% | FPS |
|---|---|---|---|
| Original SSD | 81.3 | 47.4 | 27.8 |
| The application | 82.8 | 43.0 | 27.5 |

It can be seen from the table that the method proposed in the present application has a higher detection accuracy than that of the existing SSD target detection algorithm, and the detection speed is equivalent.

In summary, the main design concept of the present application is that, in a cigarette appearance defect detection scenario, in order to solve the problem that a current point estimation-based machine learning algorithm leads to an overconfidence decision in a data scarcity area, a Bayesian method based on variational inference is proposed to improve the backbone network VGG16 of SSD, in particular, including calculating a real posterior probability by the variational inference method, replacing a point estimation mechanism of a convolution layer weight in the original backbone network VGG16 by using a form of probability distribution, then detecting the extracted features from the improved VGG16 by an SSD target detection algorithm, and furthermore, accurately determining whether the appearance of the cigarette is defective and the type and location of the defect. The present application can improve the accuracy of defect detection without losing the processing speed, not only saving a large amount of manpower and material resources, but also effectively providing reliable technical support for finding the root causes of defect types. Thus, it achieves intelligent quality risk management and control in a cigarette production workshop.

In the present embodiment, "at least one" means one or more, and "plurality" means two or more. "and/or", one association relation describing an associated object, means that there can be three kinds of relations. There are cases, for example, A and/or B can mean A alone, A and B together, and B alone. Here, A, B may be singular or plural. The character "/" generally indicates that the associated object is an "or" relationship. "At least one of", and the like, refers to any combination of these items, including any combination of singular or plural items. For example, at least one of a, b and c may represent a, b, c, a and b, a and c, b and c, or a, b and c, wherein a, b, c may be single or multiple.

The above-mentioned structures, features and effects of the present application are described in detail according to the embodiments shown in the drawings. However, the above-mentioned embodiments are merely preferred embodiments of the present application. It needs to be understood that a person skilled in the art can rationally combine and arrange various equivalent solutions without departing from and changing the design idea and technical effects of the present application. Thus, the present application is not intended to be limited to the embodiments shown in the drawings. Any changes made in accordance with the idea of this application, or modified into an equivalent embodiment of the same change, which does not exceed the spirit covered by the specification and drawings, shall be within the scope of protection of this application.

The invention claimed is:

1. A method for detecting cigarette appearance defects based on variational Bayesian inference, characterized by comprising:

pre-constructing a cigarette appearance defect detection model based on the variational Bayesian inference, wherein the cigarette appearance defect detection model is an SSD target detection model, and the cigarette appearance defect detection model comprises an improved backbone network based on the variational Bayesian inference method;

collecting appearance images of cigarettes assembled and cut in a cigarette production line as data to be detected; and performing real-time inference on the input cigarette appearance images by the cigarette appearance defect detection model to obtain a cigarette appearance defect detection result the improved backbone network based on the variational Bayesian inference method comprises calculating a posterior probability by variational inference, and replacing a point estimation mechanism of a convolution layer weight in a backbone network of an original SSD target detection model by probability distribution.

2. The method for detecting cigarette appearance defects based on variational Bayesian inference according to claim 1, characterized in that the training process of the cigarette appearance defect detection model comprises:

establishing a cigarette appearance defect detection data set as an input image data set;

extracting features by the improved backbone network by the variational Bayesian inference method to obtain a plurality of feature maps;

extracting information about the feature maps by a default box of each layer;

generating an offset of a detection box by a locator according to each piece of default box information, and comparing the offset with a ground truth to generate a locating loss;

generating a category label by a classifier according to each piece of default box information, and comparing the classified category with the ground truth to generate a classification loss;

integrating the classification loss and the locating loss to generate a total loss of the model and perform back propagation; and performing repeated iteration by the image data set until the set number of training is reached and an optimal model parameter is saved.

3. The method for detecting cigarette appearance defects based on variational Bayesian inference according to claim 2, characterized by further comprising, before performing the feature extraction:

inputting the cigarette appearance defect images and the ground truth, including a preset label and a bounding box; and calculating an IOU related to the default box, and converting the ground truth into the form of default box.

4. The method for detecting cigarette appearance defects based on variational Bayesian inference according to claim 1, characterized in that the performing real-time inference on the input cigarette appearance images by the cigarette appearance defect detection model comprises:

extracting feature maps based on the improved backbone network;

extracting information about the feature maps by a default box of each layer;

generating an offset of a detection box by a locator according to each piece of default box information;

generating a category label by a classifier according to each piece of default box information;

eliminating invalid detection boxes and removing redundant detection boxes based on the detection box offset and the category label; and outputting a final prediction box and a corresponding category label.

5. The method for detecting cigarette appearance defects based on variational Bayesian inference according to claim 4, characterized in that the eliminating invalid detection boxes comprises eliminating detection boxes with labels as background.

6. The method for detecting cigarette appearance defects based on variational Bayesian inference according to claim 4, characterized in that the removing redundant detection boxes comprises removing redundant detection boxes by non-maximum suppression.

7. The method for detecting cigarette appearance defects based on variational Bayesian inference according to claim 1, characterized in that the backbone network is a pre-feature extraction network VGG16.

* * * * *